United States Patent
Zhao et al.

(10) Patent No.: US 11,435,490 B2
(45) Date of Patent: Sep. 6, 2022

(54) SEISMIC SURVEYS USING TWO-WAY VIRTUAL SOURCE REDATUMING

(71) Applicant: Saudi Arabian Oil Company, Dhahran (SA)

(72) Inventors: Yang Zhao, Katy, TX (US); Houzhu Zhang, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 647 days.

(21) Appl. No.: 16/295,247

(22) Filed: Mar. 7, 2019

(65) Prior Publication Data
US 2020/0284932 A1 Sep. 10, 2020

(51) Int. Cl.
*G01V 1/20* (2006.01)
*G01V 1/30* (2006.01)

(52) U.S. Cl.
CPC .............. *G01V 1/20* (2013.01); *G01V 1/301* (2013.01); *G01V 2210/1425* (2013.01); *G01V 2210/1429* (2013.01); *G01V 2210/57* (2013.01)

(58) Field of Classification Search
CPC .. G01V 1/20; G01V 1/301; G01V 2210/1425; G01V 2210/1429; G01V 2210/57
See application file for complete search history.

(56) References Cited

U.S. PATENT DOCUMENTS

| | | | |
|---|---|---|---|
| 6,747,915 B2 | 6/2004 | Calvert | |
| 8,275,551 B2* | 9/2012 | Bakulin | G01V 1/36 702/14 |
| 10,073,184 B2* | 9/2018 | Faber | G01V 1/42 |
| 10,502,850 B2* | 12/2019 | Pires De Vasconcelos | G01V 1/345 |
| 2008/0225642 A1* | 9/2008 | Moore | G01V 1/28 367/73 |
| 2009/0097356 A1 | 4/2009 | Halforsen et al. | |
| 2016/0349394 A1 | 12/2016 | Lecerf et al. | |
| 2016/0377751 A1* | 12/2016 | De Meersman | G01V 1/364 702/16 |

(Continued)

OTHER PUBLICATIONS

Berron et al., "Effects of complex near surface on 4D acquisition with buried source and reciever" SEG Las Vegas 2012 Annual Meeting, 2012 (Year: 2012).*

(Continued)

*Primary Examiner* — Krystine E Breier
(74) *Attorney, Agent, or Firm* — Fish & Richardson P.C.

(57) ABSTRACT

In an example implementation, first seismic energy is generated using first seismic sources positioned on an earth's surface. First data including measurements of the first seismic energy is obtained from first geophones positioned at a first depth below the earth's surface. Second data including measurements of the first seismic energy is obtained from second geophones positioned on the earth's surface. Second seismic energy is generated using second seismic sources positioned on an earth's surface and proximal to the second geophones. Third data including measurements of the second seismic energy is obtained from third geophones positioned at the first depth below the earth's surface. A propagation of the first seismic energy along a first path is estimated based on the first, second and third data. One or more characteristics of the target are determined based on the estimate.

45 Claims, 12 Drawing Sheets

(56) References Cited

U.S. PATENT DOCUMENTS

2020/0057170 A1* 2/2020 Schonewille ............ G01V 1/36

OTHER PUBLICATIONS

International Search Report and Written Opinion issued in International Application PCT/US2020/020771 dated Jun. 19, 2020, 19 pages.

Wapenaar et al., "Seismic interferometry by crosscorrelation and by multidimentional deconvolution: a systematic comparison," Geophysical Journal International, vol. 185, No. 3, Apr. 20, 2011, 30 pages.

Van Der Neut et al., "Controlled-source interferometric redatuming by crosscorrelation and multidimentional deconvolution in elastic media," Geophysics, vol. 76, No. 4, Jan. 1, 2011, 14 pages.

Galetti et al., "Generalised receiver functions and seismic interferometry," Tectonophysics vol. 532, Dec. 13, 2011.

Alexandrov et al., "Improving imaging and repeatability on land using virtual source redatuming with shallow buried receivers," Geophysics vol. 80, No. 2, Q15-Q26, Mar.-Apr. 2015, 12 pages.

Bakulin and Calvert, "The virtual source method: Theory and case study," Geophysics vol. 71, No. 4, Jul.-Aug. 2006, 12 pages.

Bakulin et al., "Near surface changes and 4D seismic repeatability in desert environments: from days to years," SEG Denver 2014 Annual Meeting, Aug. 2014, 5 pages.

Berron et al., "Effects of complex near surface on 4D acquisition with buried source and receiver," SEG Las Vegas 2012 Annual Meeting, Sep. 2012, 5 pages.

Draganov et al., "Reflection images from ambient seismic noise," Geophysics vol. 74, No. 5, Sep.-Oct. 2009, 5 pages.

Grechka and Zhao, "Microseismic interferometry," Special Selection: Passive Sesimic and Microseismic—Part 2, The Leading Edge, Dec. 2012, 6 pages.

Mehta et al., "Improving the virtual source method by wavefield separation," Geophysics vol. 72, No. 4, V79-V86, Jul.-Aug. 2007, 9 pages.

Spitz, "Seismic trace interpolation in the F-X domain," Geophysics vol. 56, No. 6, Jun. 1991, 10 pages.

Van Der Neut and Bakulin, "Estimating and correcting the amplitude radiation pattern of a virtual source," Geophysics vol. 74, No. 2, SI27-SI36, Mar.-Apr. 2009, 10 pages.

Van Der Neut and Herrmann, "Interferometric redatuming by sparse inversion," Geophysical Journal International, vol. 192, No. 2, Feb. 2013, 5 pages.

Wapenaar and Fokkema, "Green's function representations for seismic interferometry," Geophysics vol. 71, No. 4, Jul.-Aug. 2006, 14 pages.

Zhao and Li, "Model-based radiation pattern correction for interferometric redatuming in 4D seismic," Geophysics vol. 83, No. 4, Jul.-Aug. 2018, 11 pages.

Zhao and Li, "Wavelet-crosscorrelation-based interferometric redatuming in 4D seismic," Geophysics vol. 83, No. 4, Jul.-Aug. 2018, 11 pages.

Zhao et al., "Target-oriented diversity stacking for virtual-source imaging and monitoring," The Leading Edge, Oct. 2018, 8 pages.

GCC Examination Report in Gulf Cooperation Council Appln. No. GC 2020-39321, dated Nov. 2, 2021, 4 pages.

* cited by examiner

SEISMIC SURVEYS USING TWO-WAY VIRTUAL SOURCE REDATUMING

TECHNICAL FIELD

The disclosure relates to seismic surveys.

BACKGROUND

Subsurface features (for example, structures below the earth's surface, such as geological formations) can be investigated using seismic surveys. For instance, one or more seismic sources (for example, devices for generating seismic energy) and one or more geophones (for example, devices for measuring seismic energy) can be positioned on the earth's surface or beneath the earth's surface, or both. The seismic sources direct seismic energy into the earth at one or more points on or beneath the earth's surface, or both. The seismic energy propagates through the earth (for example, by transmitting through or reflecting from one or more subsurface features, or both) and is measured by the geophones at one or more points on or beneath the earth's surface, or both. Characteristics of the subsurface features can be determined based on the measurements.

In some cases, seismic surveys can be used to determine the location of subsurface features, the composition of subsurface features, or other characteristics of the subsurface features. As an example, seismic surveys can be used to identify subterranean deposits of resources (for example, reservoirs of oil or gas).

SUMMARY

Systems and techniques for performing seismic surveys are described in this disclosure. In an example implementation, a seismic survey system includes multiple seismic sources positioned on the earth's surface, and multiple geophones each placed either on the earth's surface or beneath the earth's surface. During an example usage of the seismic survey system, a first set of seismic sources directs seismic energy into the earth at a first set of points on the earth's surface. The seismic energy propagates through the earth (for example, by transmitting through or reflecting from one or more subsurface features, or both) and is measured by a first set of geophones at a second set of points beneath the earth's surface and by a second set of geophones at a third set points on the earth's surface. Further, a second set of the seismic sources directs additional seismic energy into the earth at a fourth set points on the earth's surface proximate to the second set of geophones. The additional seismic energy propagates through the earth (for example, by transmitting through or reflecting from one or more subsurface features, or both) and is measured by a third set of geophones at fifth set of points beneath the earth's surface. Characteristics of the subsurface features can be determined based on the measurements according to redatuming techniques (for example, numerical processes that translate positions of the seismic sources or geophones to other simulated or "virtual" locations). In some cases, subsurface features below the first and third sets of geophones can be determined based on these measurements.

The implementations described in this disclosure can provide various technical benefits. As an example, implementations of the seismic survey system can be used to investigate subsurface features while reducing the number of components (for example, seismic sources or geophones, or both) that are deployed underneath the earth's surface during operation. For instance, most or all of the seismic sources of the seismic survey system can be positioned on the earth's surface (for example, rather than buried beneath the earth's surface). Similarly, most of the geophones of the seismic survey system also can be positioned on the earth's surface. As it is often easier, quicker, or cheaper to deploy components on the earth's surface compared to burying those components beneath the earth's surface, the seismic survey system can be operated more efficiently, more quickly, or in a more cost effective manner. Further, implementations of the seismic survey system can be used to investigate subsurface features, despite intervening subsurface features that might otherwise obstruct measurements. Thus, the seismic survey system can obtain accurate measurements under a variety of different operating environments.

In an aspect, a method includes generating first seismic energy using one or more first seismic sources positioned on an earth's surface, and obtaining first data from one or more first geophones positioned at a first depth below the earth's surface. The first data includes measurements of the first seismic energy by the one or more first geophones. According to the method, a computer device obtains second data from one or more second geophones positioned on the earth's surface. The second data includes measurements of the first seismic energy by the one or more second geophones. Further, second seismic energy is generated using one or more second seismic sources positioned on an earth's surface and proximal to the one or more second geophones. The computer device obtains third data from the one or more third geophones positioned at the first depth below the earth's surface. The third data includes measurements of the second seismic energy by the one or more third geophones. The computer device estimates, based on the first data, the second data, and the third data, a propagation of the first seismic energy along a first path. The first path extends from the one or more first geophones to a target positioned at a second depth below the earth's surface and to the one or more third geophones. The second depth is greater than the first depth. The computer device determines one or more characteristics of the target based on the estimated propagation of the first seismic energy along the first path.

Implementations of this aspect can include one or more of the following features.

In some implementations, estimating the propagation of the first seismic energy along the first path can include estimating, based on the first data and the second data, a propagation of the first seismic energy along a second path. The second path can extend from the one or more first geophones to the target and to the one or more second geophones.

In some implementations, estimating the propagation of the first seismic energy along the second path can include cross-correlating the first data and the second data.

In some implementations, estimating the propagation of the first seismic energy along the first path further can include estimating, based on the third data and the estimated propagation of the first seismic energy along the second path, the propagation of the first seismic energy along the first path.

In some implementations, estimating the propagation of the first seismic energy along the second path can include cross-correlating the third data and the estimated propagation of the first seismic energy along the second path.

In some implementations, the method can further include interpolating, by the computer device, the first data to obtain interpolated first data. The interpolated first data can represent simulated measurements of the first seismic energy by one or more virtual geophones positioned at a first depth below the earth's surface.

In some implementations, the method can further include interpolating, by the computer device, the third data to obtain interpolated third data. The interpolated third data can represent simulated measurements of the second seismic energy by one or more virtual geophones positioned at a first depth below the earth's surface.

In some implementations, the one or more first geophones can be positioned below a first subterranean region and above a second subterranean region. A complexity of the first subterranean region can be greater than a complexity of the second subterranean region.

In some implementations, the target can be positioned below the second subterranean region.

In some implementations, the target can be a subterranean structure.

In some implementations, a quantity of the second geophones can be greater than a sum of a quantity of the first geophones and a quantity of the third geophones.

In some implementations, the measurements of the first seismic energy by the one or more first geophones can include measurements of primary wave components of the first seismic energy.

In some implementations, the measurements of the second seismic energy by the one or more third geophones can include measurements of primary wave components of the second seismic energy.

In some implementations, determining the one or more characteristics of the target can include generating an image of the target.

In some implementations, determining the one or more characteristics of the target can include determining a subsurface feature of the target.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
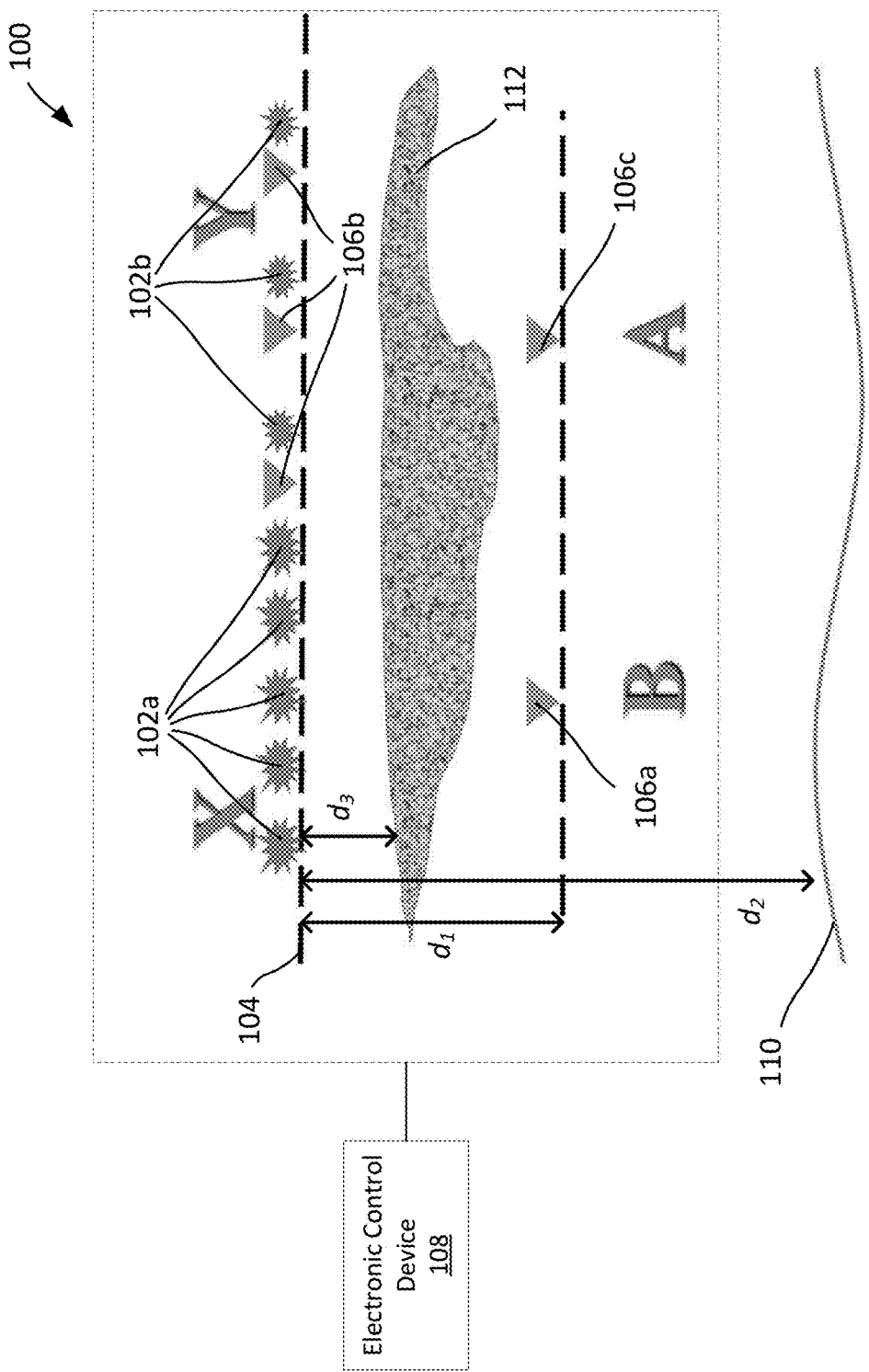
FIG. 1 is a diagram of an example seismic survey system.

An example seismic survey system 100 is shown in FIG. 1. The seismic survey system 100 includes a first set of seismic sources 102a positioned at a location X on the earth's surface 104, and a second set of seismic sources 102b positioned at a location Y on the earth's surface 104. The system 100 also includes a first set of geophones 106a positioned at a location B beneath the earth's surface 104 (for example, at a depth $d_1$), a second set of geophones 106b positioned at a location Y on the earth's surface 104 proximate to the second set of seismic source 102b, and a third set of geophones 106c positioned at a point A beneath the earth's surface 104 (for example, at a depth $d_1$). One or more of the seismic sources or geophones, or both, can be communicatively coupled to an electronic control device 108. Although an example arrangement of the seismic survey system 100 is shown in FIG. 1, the position of each of its components relative to one another is not necessarily drawn on scale.

Each seismic source is a respective device for generating seismic energy. Example seismic sources include hammers (for example, sledgehammers), explosives, air guns, plasma sound sources, "thumper trucks" (for example, vehicle-mounted impact systems that drive weights onto the earth's surface), electromagnetic pulse energy sources, seismic vibrators, boomer sources, and noise sources, among others.

Each geophone is a device that measures seismic energy. As an example, a geophone can include one or more components that convert ground movement (for example, velocity) into voltage, which may be recorded at a storage device (for example, on the geophone or the electronic control device 108). For instance, seismic energy can be determined based on a deviation of the measured voltage from a base line voltage value.

The electronic control device 108 controls the operation of the seismic sources or the geophones, or both. As an example, the electronic control device 108 can transmit command signals to one or more of the seismic sources to generate a particular amount of seismic energy at a particular time. As another example, the electronic control device 108 can transmit command signals to one or more of the geophones to obtain measurements at a particular time. As another example, the electronic control device 108 can receive measurement data from one or more of the geophones, and process the received measurements (for example, to determine the characteristics of one or more underground formations).

In the example shown in FIG. 1, the seismic survey system 100 is operated to determine characteristics of a subsurface feature 110 at a depth $d_2$. The example, the seismic survey system 100 can generate seismic energy using the seismic sources, direct the seismic energy towards the subsurface feature 110, measure seismic energy that is transmitted through the earth or reflected by subsurface features, or both, using the geophones, and determine one or more characteristics of the subsurface feature 110 based on the measurements. In some cases, the seismic survey system 100 can determine characteristics of the subsurface feature 110 using vertical seismic profile (VSP) techniques. For example, the seismic survey system 100 can estimate the location, composition, shape, or other characteristics of the subsurface feature 110 based on correlations between one or more of these characteristics and the properties of the measured signals (for example, indicating the propagation time of seismic energy through the earth or the degree of attenuation as the seismic energy its transmitted or reflected by subsurface features). In some cases, seismic survey system 100 can generate one or more images of the subsurface feature 110.

The subsurface feature 110 can be any subterranean geological formation. As an example, the subsurface feature 110 can be a deposit of one or more particular types of materials or a void region. As another example, the subsurface feature 110 can be a portion of earth having different physical characteristics than the portions of earth around it (for example, different composition or density).

In this example, an intervening subsurface feature 112 is positioned between the seismic survey system 100 and the subsurface feature 110 at a shallower depth $d_3$. The intervening subsurface feature 112 also can be any subterranean geological formation (for example, a deposit of one or more particular types of materials, a void region, or a portion of earth having different physical characteristics than the portions of earth around it). In some cases, the intervening subsurface feature 112 may be a "complex" formation (for example, a geological formation having non-homogenous characteristics, irregular boundaries, or ill-defined boundaries). In some cases, the intervening subsurface feature 112 may be more complex than the subsurface feature 110. Due to the presence of the intervening subsurface feature 112, seismic energy originating at the earth's surface 104 may be attenuated or otherwise altered when transmitted through the intervening subsurface feature 112 towards the subsurface feature 110.

To mitigate the effects of the intervening subsurface feature 112 on the survey data, the seismic survey system 100 obtain seismic energy measurements and process those measurements according to redatuming techniques (for example, numerical processes that translate positions of the seismic sources or geophones to other simulated or "virtual" locations). For example, the seismic survey system 100 can process the measurements to simulate the presence of one or more "virtual" seismic sources generating seismic energy at the location B, and corresponding "virtual" measurements of that seismic energy obtained at the location A. As the locations B and A are below the intervening subsurface feature 112, virtual measurements obtained at the location A corresponding to virtual seismic energy generated at the location B are not substantially effected by the presence of the intervening subsurface feature 112 (for example, seismic energy can propagate from the location B to the subsurface feature 110 and reflect towards the location A, without impinging the intervening subsurface feature 112 along this path). Accordingly, the characteristics of the subsurface feature 110 can be determined with a greater degree of accuracy.

Figure 2A:
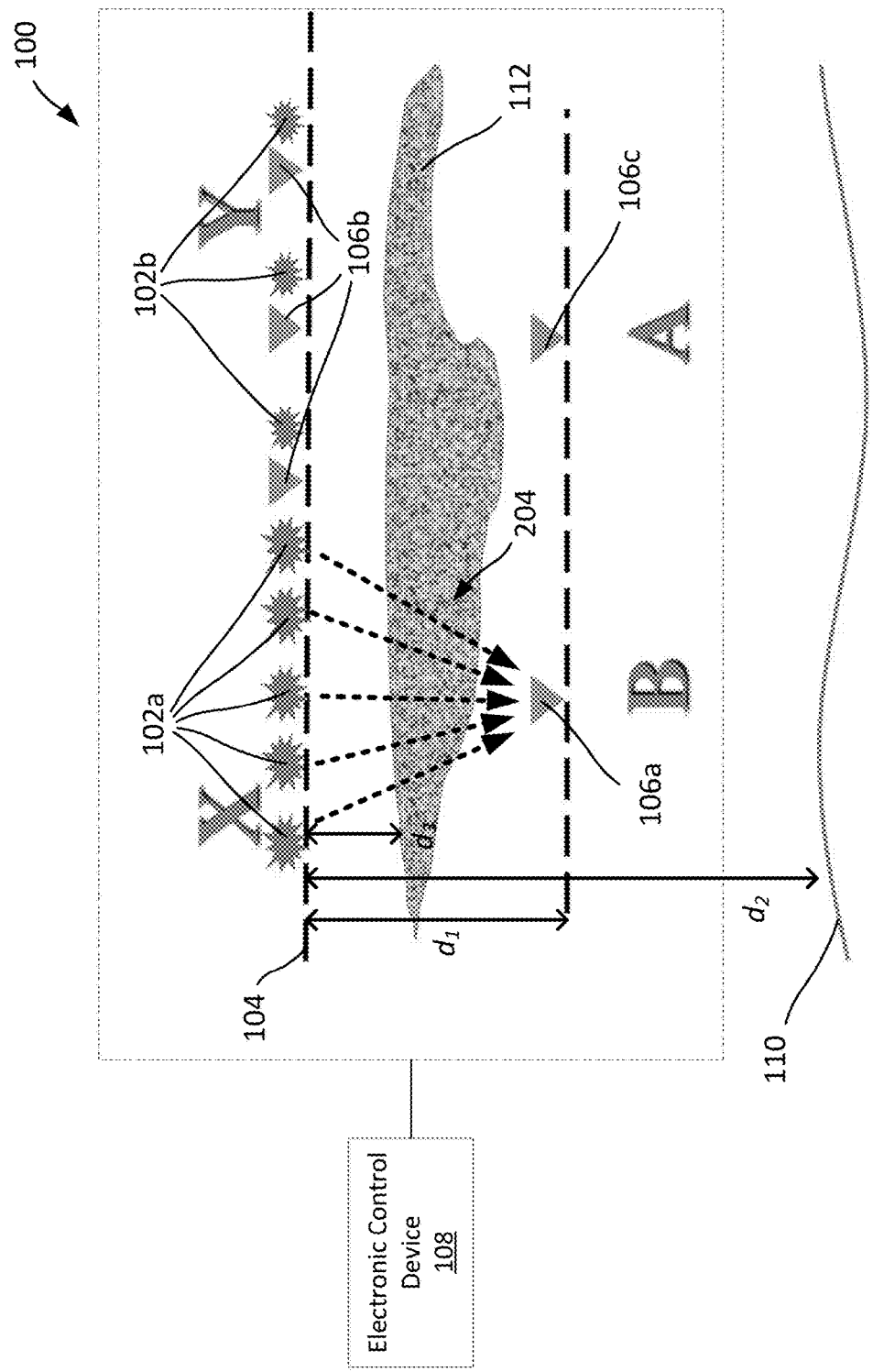
FIGS. 2A-2C, and 3-5 are diagrams showing example operations of a seismic survey system.

As an example, as shown in FIG. 2A, the seismic survey system 100 generates seismic energy 204 using the first set of seismic sources 102a. For instance, each of the seismic sources can generate a respective pulse or impulse at the earth's surface 104. In some cases, some or all of the seismic sources can generate seismic energy simultaneously or concurrently. In some cases, some or all of the seismic sources can generate seismic energy sequentially.

The seismic energy 204 generated by the first set of seismic sources 102a is transmitted, at least in part, through the intervening subsurface feature 112, and is measured by the first set of geophones 106a at the location B. These measurements are referred to as d(X|B).

Measurements obtained by the first set of geophones 106a can be filtered to remove certain signal components (for example, signal components that are less useful in determining the characteristics of subsurface features) while retaining other signal components (for example, signal components that are more useful in determining the characteristics of subsurface). As an example, the measurements obtained by the first set of geophones 106a may contain "P-wave" components (for example, primary waves or pressure waves formed from alternating compressions and rarefactions) and "S-wave" components (for example, secondary waves or shear waves having motion perpendicular to the direction of wave propagation). The measurements can be filtered such that certain P-wave components are retained (for example, P-waves propagating along a direct path from the first set of seismic sources 102a) while other P-wave components (for example, P-waves propagating along an indirect path from the first set of seismic sources 102a, such as a path reflecting from a subsurface feature) and S-wave components are eliminated or otherwise attenuated. In some cases, the measurements can be filtered using a time gating technique. For example, P-waves typically propagate faster through the earth than S-waves, and thus typically will arrive at the first set of geophones 106a prior to the arrival of the S-waves. Accordingly, measurements can be obtained within a certain interval of time corresponding to the expected arrival of P-waves traveling directly from the first set of geophones 106a (for example, "first arrival" signals) and prior to the expected arrival of S-waves and P-waves reflecting from subsurface features (for example, the subsurface feature 110). In some cases, measurement also can be filtered using f-k filtering techniques (for example, removing energy from seismic data by applying frequency, wavenumber, or velocity filters in the frequency-wavenumber domain).

Figure 2B:
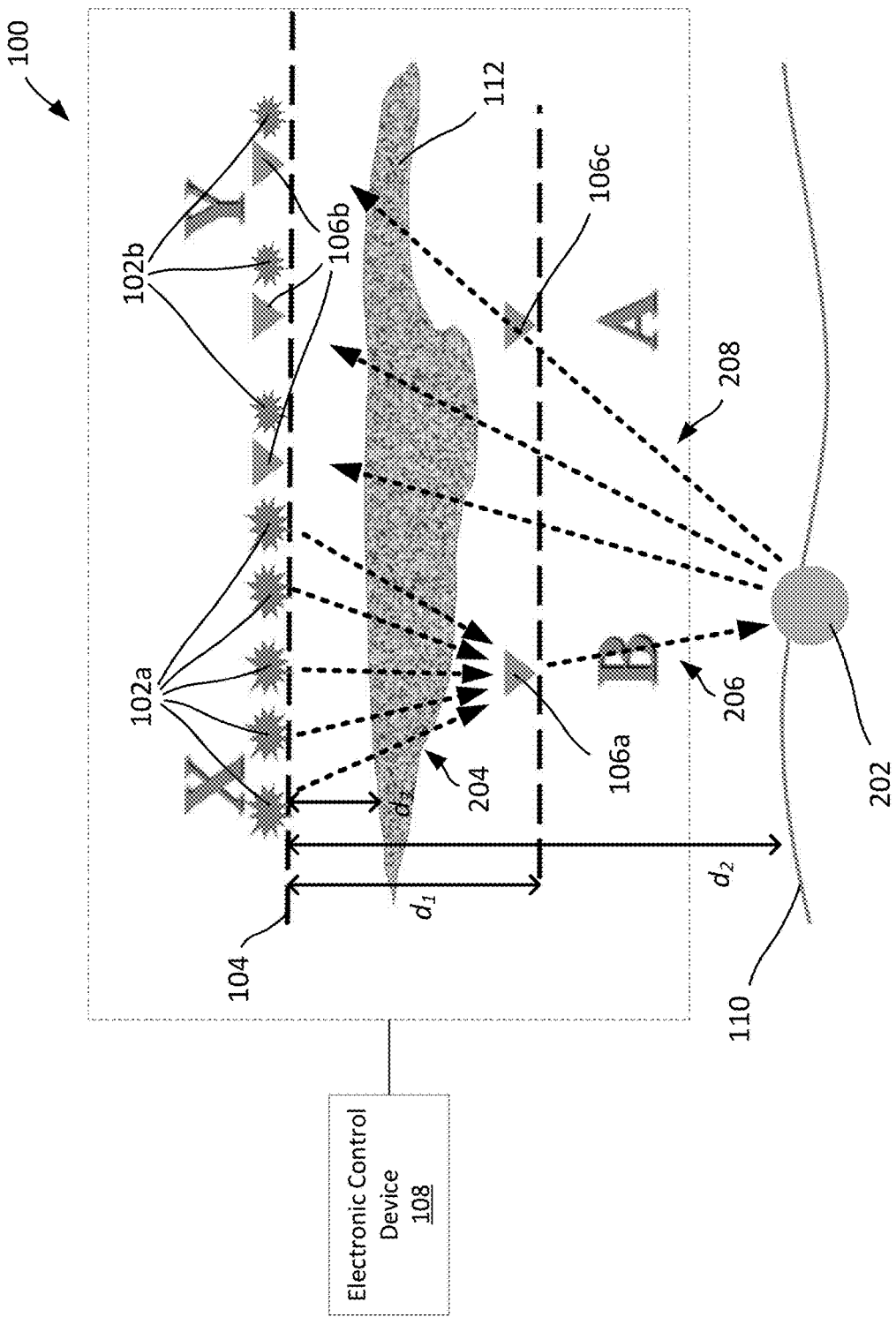

As shown in FIG. 2B, the seismic energy generated by the first set of seismic sources 102a continues propagating beyond the location B towards the subsurface feature 110 (for example, in the form of seismic energy 206). Upon reaching the subsurface feature 110 (for example, a target region 202 of the subsurface feature 110), at least some of the seismic energy 206 reflects from the subsurface feature 110 back towards the earth's surface 104 (for example, in the form of seismic energy 208). At least some of the reflected seismic energy 208 propagates through the location A and towards the location Y, where is measured by the second set of geophones 106b. These measurements are referred to as d(X|Y).

Measurements obtained by the second set of geophones 106b also be filtered to remove certain signal components (for example, signal components that are less useful in determining the characteristics of subsurface features) while retaining other signal components (for example, signal components that are more useful in determining the characteristics of subsurface). As an example, the measurements obtained by the second set of geophones 106a also may contain P-wave components and S-wave components. The measurements can be filtered such that certain P-wave components are retained (for example, P-waves propagating along an indirect path from the first set of seismic sources 102a and reflecting from the subsurface feature 110) while other P-wave components (for example, P-waves propagating along a direct path from the first set of seismic sources 102a) and S-wave components are eliminated or otherwise attenuated using a time gating technique. For instance, measurements can be obtained within a certain interval of time corresponding to the expected arrival of P-waves traveling from the first set of geophones 106a and reflecting from the subsurface feature 110 (for example, the target region 202) and after the expected arrival of S-waves and P-waves traveling directly from the first set of seismic sources 102a. Thus, the filtered measurements substantially correspond to P-waves reflected from the subsurface feature, rather than other signals components. In some cases, measurement also can be filtered using f-k filtering techniques.

Figure 2C:
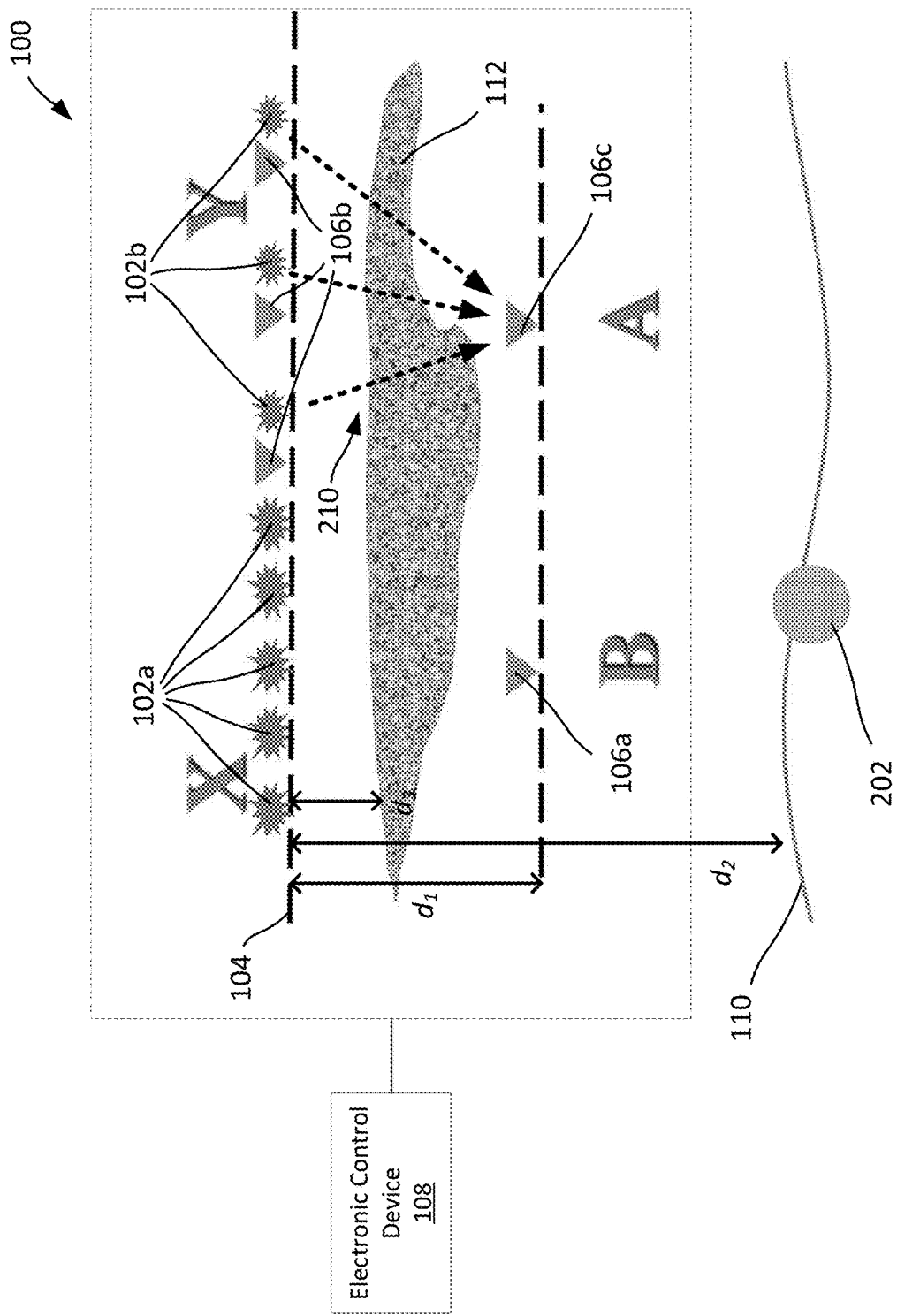

As shown in FIG. 2C, the seismic survey system 100 also generates seismic energy 210 using the second set of seismic sources 102b. For instance, each of the seismic sources can generate a respective pulse or impulse at the earth's surface 104. In some cases, some or all of the seismic sources can generate seismic energy simultaneously or concurrently. In some cases, some or all of the seismic sources can generate seismic energy sequentially.

The seismic energy 210 generated by the second set of seismic sources 102b is transmitted, at least in part, through the intervening subsurface feature 112 and is measured by the third set of geophones 106c at the location A. The measurements are referred to as d(Y|A).

Measurements obtained by the third set of geophones 106c also can be filtered to remove certain signal components (for example, signal components that are less useful in determining the characteristics of subsurface features) while retaining other signal components (for example, signal components that are more useful in determining the characteristics of subsurface). As an example, the measurements obtained by the third set of geophones 106c also may contain P-wave components and S-wave components. The measurements can be filtered such that certain P-wave components are retained (for example, P-waves propagating along a direct path from the second set of seismic sources 102b) while other P-wave components (for example, P-waves propagating along an indirect path from the second set of seismic sources 102b, such as a path reflecting from a subsurface feature) and S-wave components are eliminated or otherwise attenuated. Measurements can be obtained within a certain interval of time corresponding to the expected arrival of P-waves traveling directly from the second set of geophones 106b and prior to the expected arrival of S-waves and P-waves reflecting from subsurface features (for example, the subsurface feature 110). In some cases, measurement also can be filtered using f-k filtering techniques The measurements d(X|B), d(X|Y), and d(Y|A) can be processed according to redatuming techniques to simulate the presence of one or more "virtual" seismic sources generating seismic energy at the location B. These measurements can also be processed to simulate corresponding "virtual" measurements of that seismic energy obtained at the location A.

As an example, source side radatuming can be performed to simulate the presence of one or more "virtual" seismic sources generating seismic energy at the location B and corresponding "virtual" measurements of that seismic energy obtained at the location Y d(B|Y). This can be performed by cross-correlating the measurements d(X|B) and d(X|Y). As an example, a cross-correlation of the measurements can be performed to remove the contribution of seismic energy propagating along a path from the location X to the location B, from the seismic energy seismic energy propagating along a path from the location X, reflecting from the subsurface feature 110, and arriving at the location Y. For instance, this can be determined using the relationship:

$$d(B|Y) = \sum_{X} g(X|B)d(X|y)d\omega, \quad \text{Eq. 1}$$

where g(X|B) is the Green's function of measurements d(B|X).

Further, receiver side radatuming can be performed to simulate the presence of one or more "virtual" seismic sources generating seismic energy at the location B, corresponding "virtual" measurements of that seismic energy obtained at the location A d(B|A). This can be performed by cross-correlating the measurement d(Y|A) and the virtual measurement d(B|Y). As an example, a cross-correlation of the measurements can be performed to remove the contribution of seismic energy propagating along a path from the location A to the location Y, from the seismic energy seismic energy propagating along a path from the location B, reflecting from the subsurface feature 110, and arriving at the location Y. For instance, this can be determined using the relationship:

$$d(B|A) = \sum_{Y} g(Y|A)d(B|Y)d\omega, \quad \text{Eq. 2}$$

where g(Y|A) is the Green's function of measurements d(Y|A).

Figure 3:
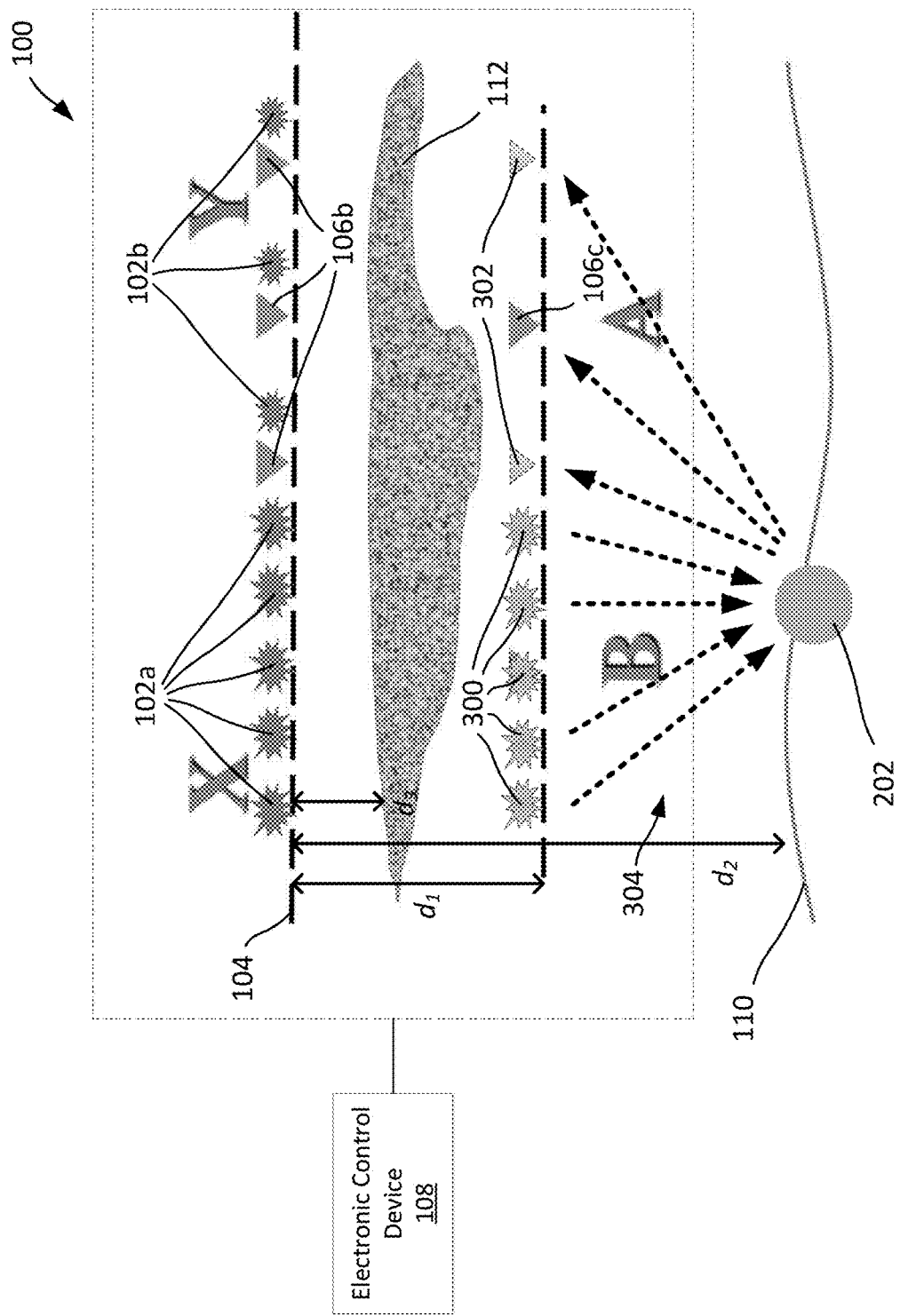

As shown in FIG. 3, the virtual measurement d(B|A) corresponds seismic energy 304 generated at the location B (for example, by simulated seismic sources 300) propagating along a path from the location B, reflecting from the subsurface feature 110, and measured at the location A (for example, by the geophone and 106c or simulated geophones 302, or both). As the locations B and A are below the intervening subsurface feature 112, these virtual measurements do not include signal contributions from the intervening subsurface feature 112 (for example, seismic energy can propagate from the location B to the subsurface feature 110 and reflect towards the location A, without impinging the intervening subsurface feature 112). Accordingly, by performing "two-way" redatuming (for example, performing both source side redatuming and receiver side redatuming), the characteristics of the subsurface feature 110 can be determined with a greater degree of accuracy.

In some cases, the measurements obtained by the seismic survey system 100 can be interpolated to stimulate the presence of additional seismic sources or geophones, or both. This can be useful, for example, in providing additional insight regarding subsurface features, without requiring the physical deployment of additional seismic sources or geophones, or both, in the field.

Figure 4:
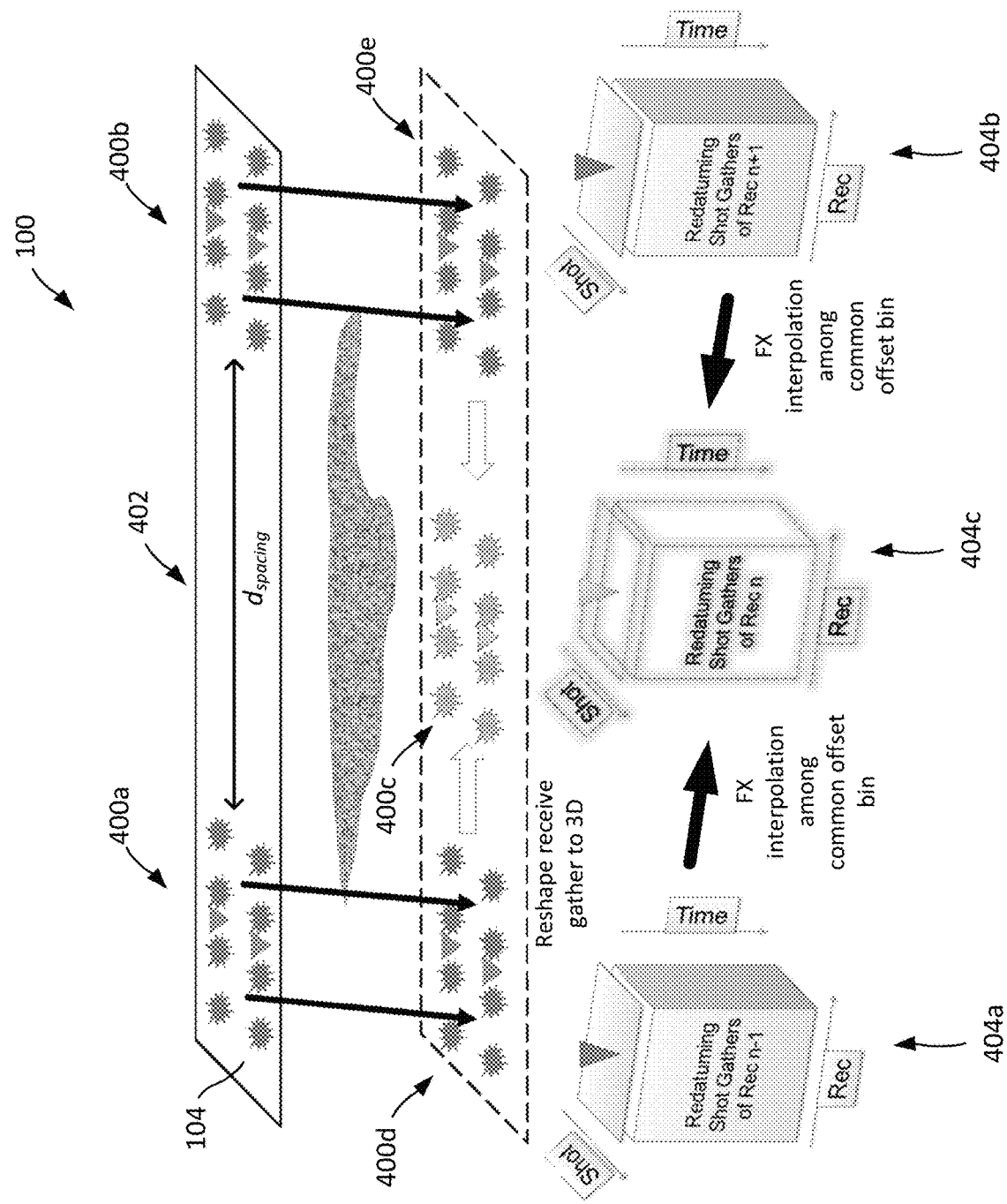

For instance, source side interpolation can be performed to increase the effective number of seismic sources (for example, virtual seismic sources) that are positioned beneath the earth's surface. As an example, FIG. 4 shows an example configuration of the system 100 including two different arrays of seismic sources 400a and 400b on the earth's surface 104. For ease of illustration, certain portions of the seismic survey system 100 have been omitted. The seismic sources 400a and 400b can correspond, for example, to two different sets of the first set of seismic sources 102a and the second set of seismic sources 102b shown in FIG. 1. The arrays of seismic sources 400a and 400b are separated by a distance $d_{spacing}$. Accordingly, no seismic energy is generated in the region 402 between them. Similarly, no seismic energy measurements are made in the region 402.

However, measurements obtained by the arrays of seismic sources 400a and 400b can be interpolated to simulate the presence of a virtual array of seismic sources 400c (for example, positioned between the virtual array of seismic sources 400d and 400e corresponding the seismic sources 400a and 400b, respectively). This can be performed using f-x domain interpolation (FX interpolation) or f-x-y domain interpolation (FXY interpolation) techniques (for example, two or three-dimensional interpolation). For example, the seismic survey system 100 can obtain a first data set 404a corresponding to measurements associated with the array of seismic sources 400a, and a second data set 404b corresponding to measurements associated with the array of seismic sources 400b. Each data set 404a and 404b can be multi-dimensional. For example, each data set 404a and 404b can include data in a first dimension corresponding to recorded signal measurements (for example, "rec"), data in a second dimension corresponding to the time of those measurements (for example, "time"), and data in a third dimension corresponding to a particular instance of generated seismic energy (for example, "shot"). Recorded measurements from the first data set 404a (for example, "rec n−1") can be interpolated with recorded measurements from the second data set 404b (for example, "rec n+1") to obtain a third data set 404c corresponding to estimated measurements that would be obtained by an intervening array of seismic sources between them (for example, "rec n").

Figure 5:
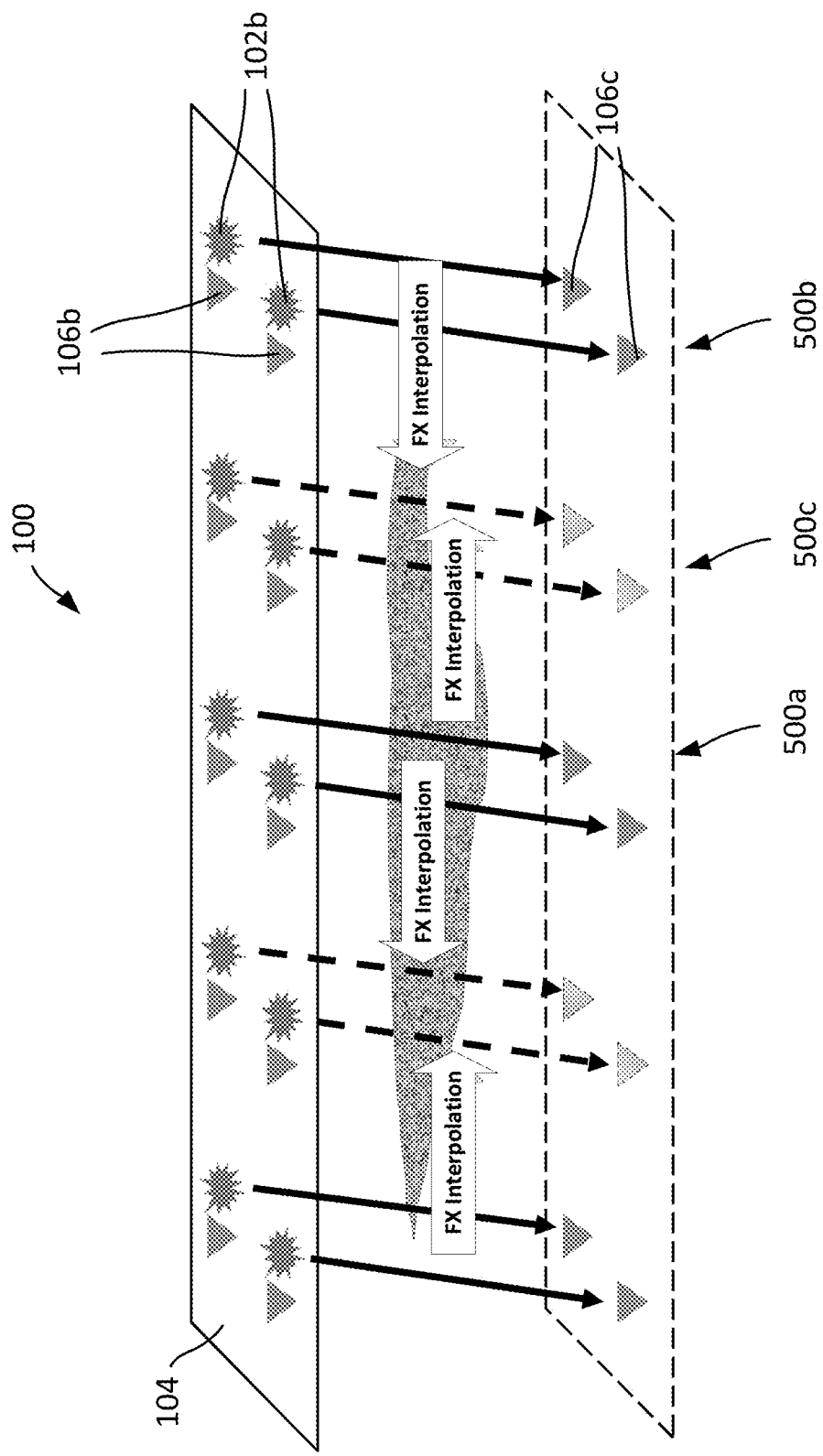

As another example, receiver side interpolation can be performed to increase the effective number of geophones (for example, virtual geophones) that are positioned beneath the earth's surface. As an example, FIG. 5 shows an example configuration of the system 100. For ease of illustration, certain portions of the seismic survey system 100 have been omitted. As shown in FIG. 5, the seismic survey system 100 includes a second set of seismic source 102b positioned on the earth's surface 104, a second set of geophones 106b positioned on the earth's surface 104, and third set of geophones 106c positioned beneath the earth's surface 104. Each seismic source 102b is positioned proximal to a corresponding geophone 106b. Further, there are a greater number of geophones on the earth's surface 104 than geophones beneath the earth's surface 104.

However, measurements obtained by the third set of geophones 106c can be interpolated to simulate the presence of additional geophones beneath the earth's surface (for example, positioned between the geophones 106c, each corresponding to a different seismic source 102b). This can be performed using FX or FXY interpolation techniques. For example, the seismic survey system 100 can obtain, for each seismic source 102b and geophone 106c pair, a respective set of measurements (for example, indicating seismic energy generated by that seismic source 102b and propagating to that geophone 106c). Each data set can be multi-dimensional. For example, each data set can include a first dimension corresponding to recorded signal measurements, a second dimension corresponding to the time of those measurements, and a third dimension corresponding to a particular instance of generated seismic energy. Recorded measurements from one data set can be interpolated with recorded measurements from another second data set to obtain estimated measurements corresponding to a seismic source and geophone between them. For example, referring to FIG. 5, measurements obtained using the seismic source-geophone pair 500a and measurements obtained using the seismic source-geophone pair 500b can be interpolated to obtain estimated measurements corresponding to a virtual seismic source-geophone pair 500c between them. In some cases, data can be interpolated according of the following relationship:

$$d(B|A) = \sum_{X,Y} g(X|B) d(B|Y) g(Y|A) d\omega. \qquad \text{Eq. 3}$$

The implementations described in this disclosure can provide various technical benefits. As an example, implementations of the seismic survey system can be used to investigate subsurface features, while reducing the number of components (for example, seismic sources or geophones, or both) that are deployed underneath the earth's surface during operation. For instance, most or all of the seismic sources of the seismic survey system can be positioned on the earth's surface (for example, rather than buried beneath the earth's surface). Similarly, most of the geophones of the seismic survey system also can be positioned on the earth's surface. As it is often easier, quicker, or cheaper to deploy components on the earth's surface compared to burying those components beneath the earth's surface, the seismic survey system can be operated more efficiently, more quickly, or in a more cost effective manner. Further, implementations of the seismic survey system can be used to investigate subsurface features, even despite intervening subsurface features that might otherwise obstruct measurements. Thus, the seismic survey system can obtain accurate measurements under a variety of different operating environments.

Figure 6A:
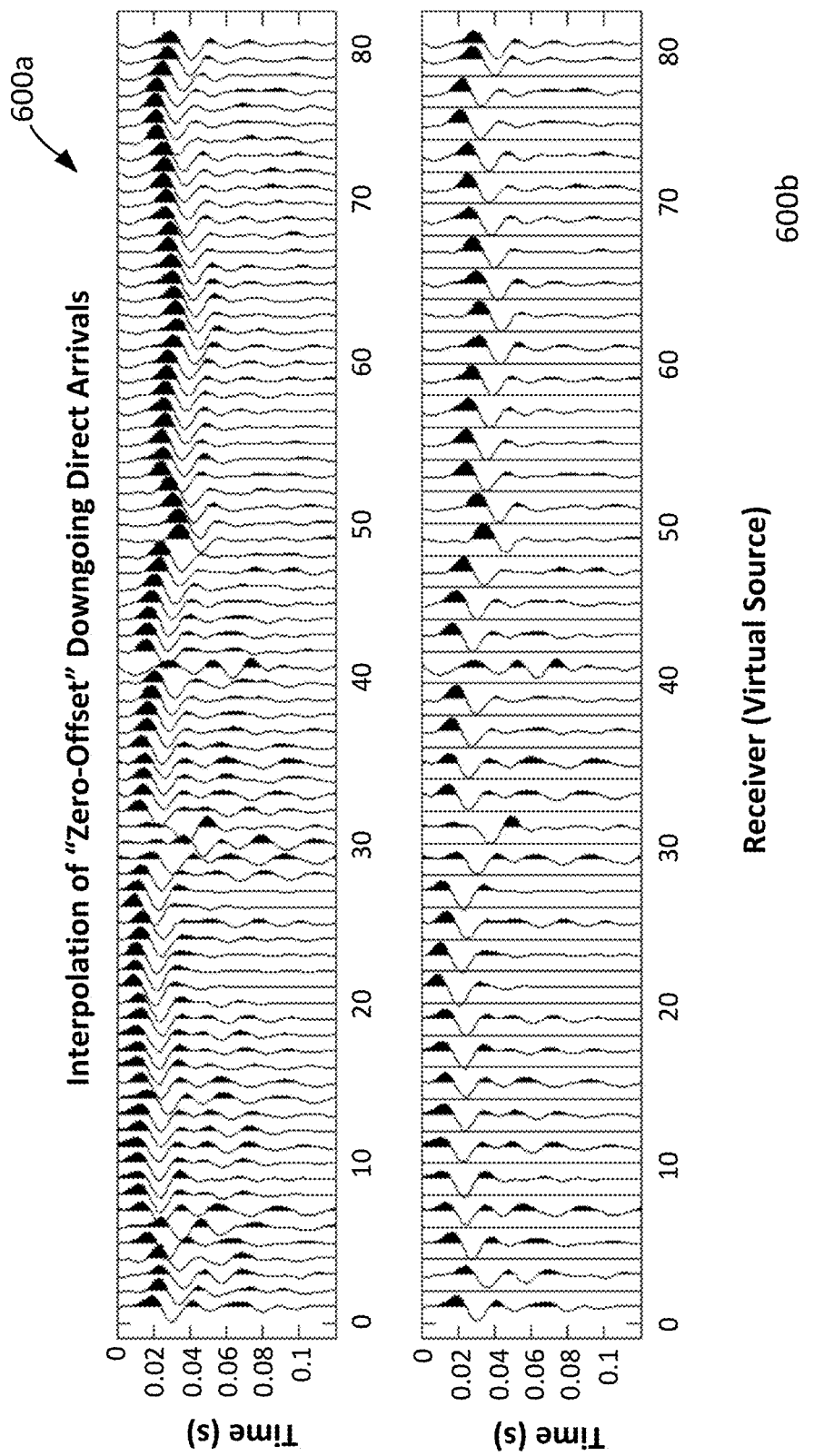
FIGS. 6A, 6B, and 7 show experimental data obtained using an example seismic survey system.
Figure 6B:
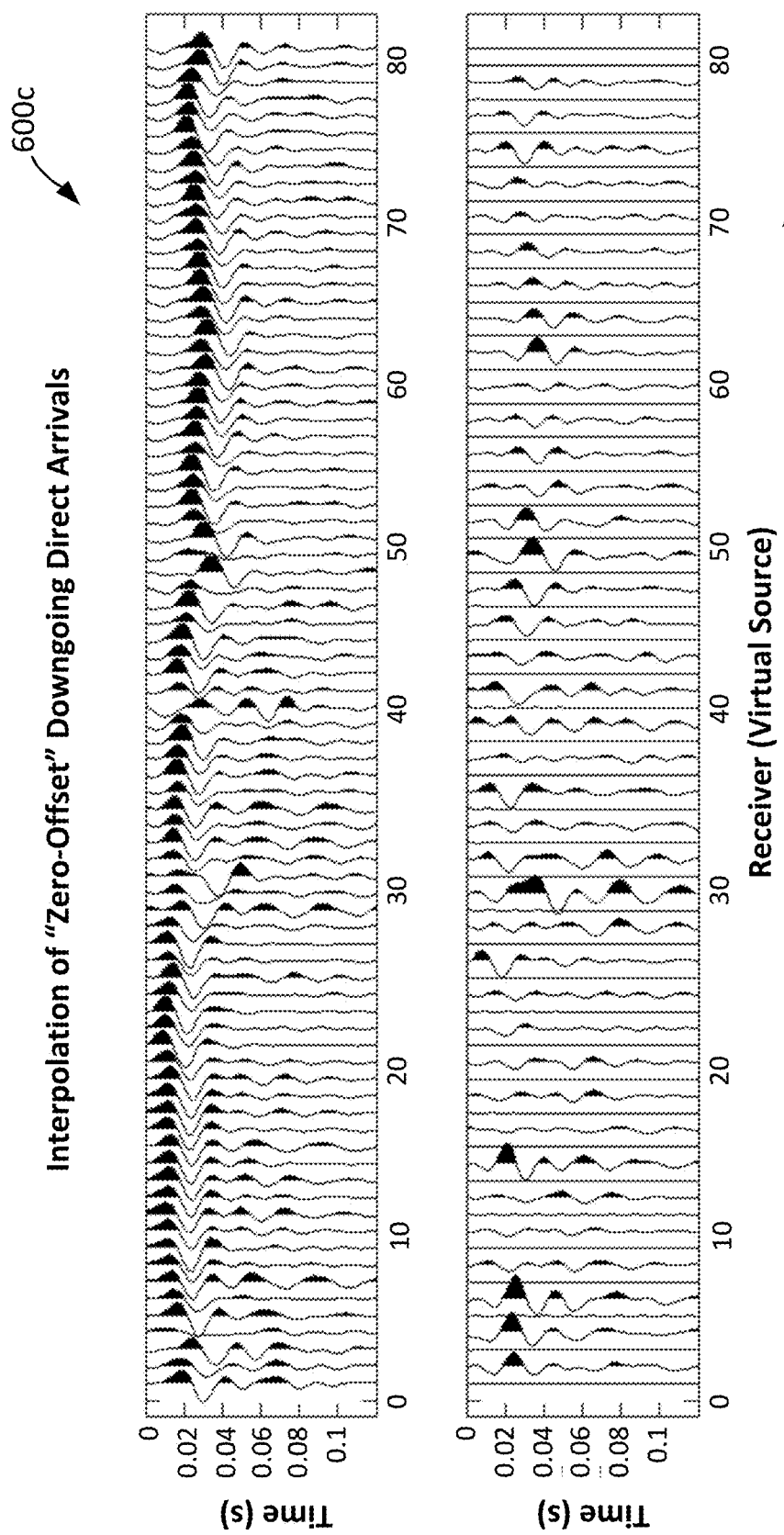
Figure 7:
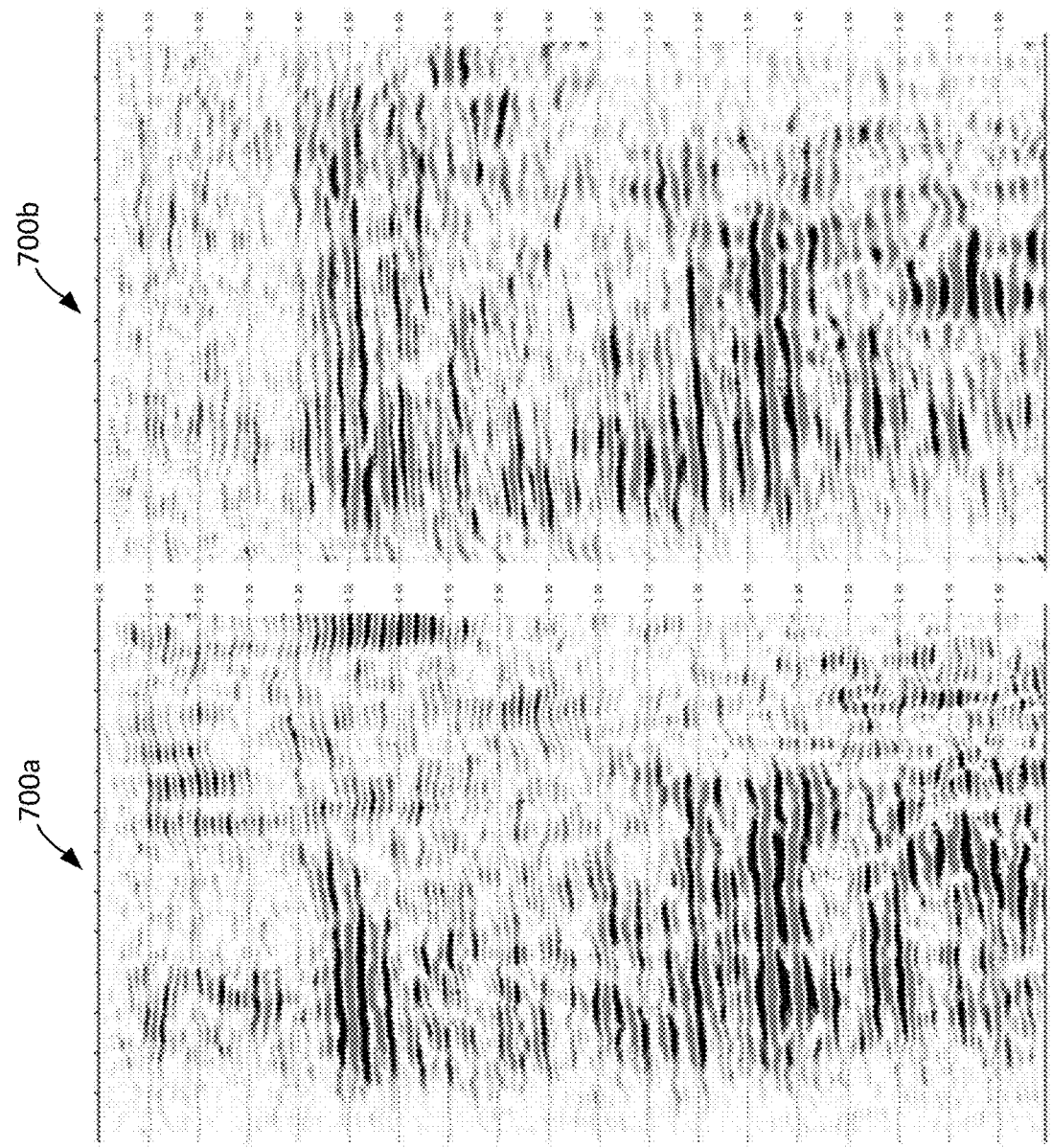

FIGS. 6A, 6B, and 7 show example experimental data obtained using implementations of the systems and techniques described in this disclosure. In this experiment, several two-dimensional seismic surveys were acquired over the course of 19 months over an onshore field in Saudi Arabia. The several were collected within a 3-month period. After a 17-month break additional surveys were acquired over a period of a week. All seismic surveys were acquired with Mertz 26 vibrators (Mertz Manufacturing Inc., Ponca City, OK) with most shot locations repeated with better than 1 meter (m) accuracy. A two-dimensional line of 80 receiver stations were installed with co-located geophones and hydrophones cemented in individual vertical boreholes spaced every 30 m with the sensors at depths up to 50 m below surface. Dense 3D areal shooting (for example, 7.5 m inline and 7.5 m crossline) was performed for efficient linear and scattered noise removal in processing, and for optimum illumination above the output virtual source (VS) location. The corresponding offsets range from 0 m up to 2400 m. The near-surface sand-layer thickness varies from a few meters to several tens of meters. The near surface that is covered by thick sand is considered an area with bad seismic data quality. Below the near-surface is simple layer-cake geology, and its associated reflector dip is generally less than 5 degrees. A number of layers with large velocity contrasts overlaying a target reflector at approximately 2000 m depth. The image quality and repeatability of both post-stack and pre-stack data suggests the majority of the changes are associated with extremely shallow near-surface variations, which also raises a challenge for the VS processing—noise, multiples, and mode-converted waves are superimposed on, or immediately follow the downgoing energy. Seismic stacks from regular processing (details in the sections of image quality and repeatability) and conventional VS processing appear to be inconsistent between the first and second batch of surveys.

The data preprocessing workflow includes noise removal, VS redatuming, and common-depth point (CDP) stacking. F-k filtering was applied in the common-receiver domain. During the processing, an auto-picking algorithm was used to pick the first arrivals. The picks are used to window the direct arrivals to provide downgoing-wave estimates.

FIGS. 6A and 6B show plots 600a-d including original downgoing wavefields (for example, direct arrivals) recorded by buried receivers treated as redatuming operators, with half of the trace emptied. For the remaining half operators, a standard FX interpolation was performed to invert back to the original grid. The residual between interpolated and ground-truth was checked, and the residuals are considered as relatively small errors. Plots 600*a* shows the original downgoing wavefield. Plots 600*b* shows its corresponding sparse selection. Plots 600*c* shows the interpolated sparse traces. Plots 600*d* shows the data residuals between original and interpolated data.

Redatuming operators interpolated from FIGS. 6A and 6B were used to generate seismic data. FIG. 7 shows common midpoint (CMP) stacks obtained from two-way redatuming using sparse downhole sensors (for example, using implementations of the systems and techniques described in this disclosure) (plot 700*a*), and one-way redatuming use full downhole sensor (plot 700*b*). As shown in FIG. 7, the seismic survey systems and techniques described in this disclosure yield measurement quality comparable to the use of several fold more seismic sources and receivers, but with reduced field cost due to the fewer number of seismic source and receives deployed in the field.

EXAMPLE PROCESSES

Figure 8:
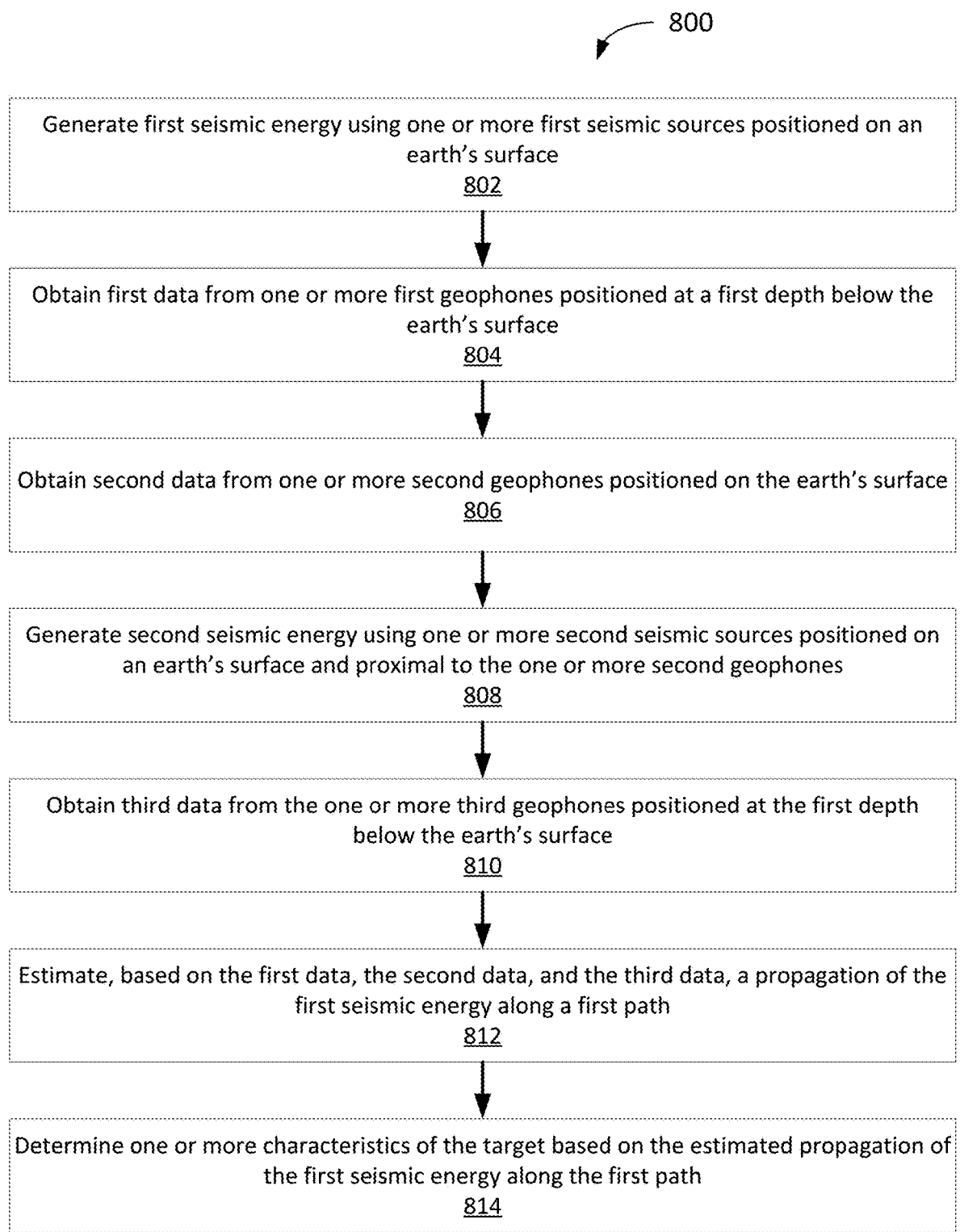
FIG. 8 is a flow chart diagram of an example process for processing seismic survey data.

An example process 800 for processing seismic survey data is shown in FIG. 8. The process 800 can be performed to determine the characteristics of one or more subsurface features. In some cases, the process 800 can be performed by the seismic survey systems described in this disclosure (for example, the seismic survey system 100 shown and described with respect to FIGS. 1-5).

In the process 800, first seismic energy is generated using one or more first seismic sources positioned on an earth's surface (step 802). As an example, first seismic energy can be generated using a first set of seismic sources 102*a* at a location X, for instance, as shown and described with respect to FIG. 2A.

First data is obtained from one or more first geophones positioned at a first depth below the earth's surface (step 804). The first data can include measurements of the first seismic energy by the one or more first geophones. As an example, first data can be obtained from a first set of geophones 106*a* at a location B, for instance, as shown and described with respect to FIG. 2A. The measurements of the first seismic energy by the one or more first geophones can include measurements of primary wave components of the first seismic energy.

A computer device obtains second data from one or more second geophones positioned on the earth's surface (step 806). The second data includes measurements of the first seismic energy by the one or more second geophones. As an example, second data can be obtained from a second set of geophones 106*b* at a location Y, for instance, as shown and described with respect to FIG. 2B. The computer device can include, for example, the electronic control device 108 shown and described with respect to FIG. 1. The computer device can include one or more of the components shown and described with respect to FIG. 9.

The computer device generates second seismic energy using one or more second seismic sources positioned on an earth's surface and proximal to the one or more second geophones (step 808). As an example, second seismic energy can be generated using a second set of seismic sources 102*b* at the location Y, for instance, as shown and described with respect to FIG. 2C.

The computer device obtains third data from the one or more third geophones positioned at the first depth below the earth's surface (step 810). The third data includes measurements of the second seismic energy by the one or more third geophones. As an example, third data can be obtained from a third set of geophones 106*c* at a location A, for instance, as shown and described with respect to FIG. 2C. The measurements of the second seismic energy by the one or more third geophones can include measurements of primary wave components of the second seismic energy.

The computer device estimates, based on the first data, the second data, and the third data, a propagation of the first seismic energy along a first path (step 812). The first path extends from the one or more first geophones to a target positioned at a second depth below the earth's surface and to the one or more third geophones. The second depth is greater than the first depth. As an example, the first path can extend (i) from the first set of geophones 106 at the location B, (ii) to a target 202, and (iii) to the third set of geophones 106*c* at the location A, for instance, as shown and described with respect to FIG. 3. The target can be a subterranean structure.

The computer device determines one or more characteristics of the target based on the estimated propagation of the first seismic energy along the first path (step 814). As an example, the computer device can generate one or more images of the target. As another example, the computer device can determine a subsurface feature of the target.

In some implementations, estimating the propagation of the first seismic energy along the first path can include estimating, based on the first data and the second data, a propagation of the first seismic energy along a second path. The second path can extend from the one or more first geophones to the target and to the one or more second geophones. As an example, the second path can extend (i) from the first set of geophones 106*a* at the location B, (ii) to the target 202, and (iii) to the second set of geophones 106*b* at the location Y, for instance, as shown and described with respect to FIG. 2B. Estimating the propagation of the first seismic energy along the second path can include cross-correlating the first data and the second data.

In some implementations, estimating the propagation of the first seismic energy along the first path can include estimating, based on the third data and the estimated propagation of the first seismic energy along the second path, the propagation of the first seismic energy along the first path. Estimating the propagation of the first seismic energy along the second path can include cross-correlating the third data and the estimated propagation of the first seismic energy along the second path.

In some implementations, the process 800 can include interpolating, by the computer device, the first data to obtain interpolated first data. The interpolated first data can represent simulated measurements of the first seismic energy by one or more virtual geophones positioned at a first depth below the earth's surface. In some implementations, the process 800 can include interpolating, by the computer device, the third data to obtain interpolated third data. The interpolated third data can represent simulated measurements of the second seismic energy by one or more virtual geophones positioned at a first depth below the earth's surface. Example interpolation techniques are described, for instance, with respect to FIGS. 4 and 5.

In some implementations, the one or more first geophones can be positioned below a first subterranean region and above a second subterranean region. A complexity of the first subterranean region can be greater than a complexity of the second subterranean region. In some implementations, the target can be positioned below the second subterranean region. As an example, the one or more first geophones can be positioned below an intervening subsurface feature 112 at a depth $d_3$ and above a subsurface feature 110 at a depth $d_2$, for instance, as shown and described with respect to FIG. 1.

In some implementations, a quantity of the second geophones can be greater than a sum of a quantity of the first geophones and a quantity of the third geophones.

EXAMPLE SYSTEMS

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the seismic survey system 100 (for example, the electronic control device 108) can be implemented using digital electronic circuitry, or in computer software, firmware, or hardware, or in combinations of one or more of them. In another example, the process shown in FIG. 8 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (for example, the Internet), a network comprising a satellite link, and peer-to-peer networks (for example, ad hoc peer-to-peer networks). A relationship of client and server may arise by virtue of computer programs running on the respective computers and having a client-server relationship to each other.

Figure 9:
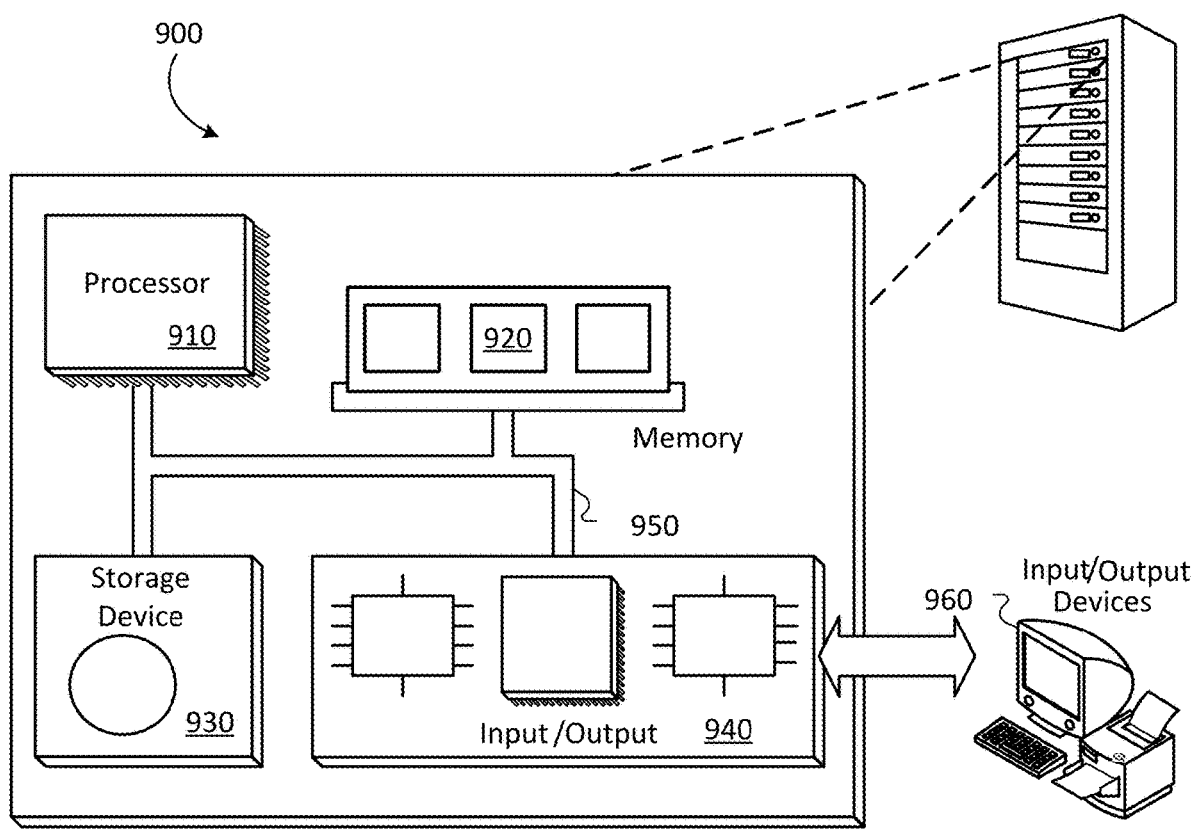
FIG. 9 is a schematic diagram of an example computer system.

FIG. 9 shows an example computer system 900 that includes a processor 910, a memory 920, a storage device 930 and an input/output device 940. Each of the components 910, 920, 930 and 940 can be interconnected, for example, by a system bus 950. In some implementations, the computer system 900 can be used to control the operation of a spectrometer. For example, the electronic control device 108 shown in FIGS. 1 and 2A-2C can include a computer system 900 to control the operation of one or more components of a spectrometer or process measurement data, or both. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:

1. A method comprising:
generating first seismic energy using one or more first seismic sources positioned on an earth's surface;
obtaining first data from one or more first geophones positioned at a first depth below the earth's surface, the first data comprising measurements of the first seismic energy by the one or more first geophones;
obtaining, by a computer device, second data from one or more second geophones positioned on the earth's surface, the second data comprising measurements of the first seismic energy by the one or more second geophones;
generating second seismic energy using one or more second seismic sources positioned on an earth's surface and proximal to the one or more second geophones, wherein a gap region having an absence of seismic sources is positioned between the one or more first seismic sources and the one or more second seismic sources;
obtaining, by the computer device, third data from the one or more third geophones positioned at the first depth below the earth's surface, the third data comprising measurements of the second seismic energy by the one or more third geophones;
estimating, by the computer device based on the first data, the second data, and the third data, a propagation of the first seismic energy along a first path, the first path extending from the one or more first geophones to a target positioned at a second depth below the earth's surface and to the one or more third geophones, wherein the second depth is greater than the first depth;
interpolating, by the computer device, the first data and the third data to obtain interpolated data, wherein the interpolated data represents a simulated generation of seismic energy by one or more virtual seismic sources positioned in the gap region at the first depth below the earth's surface; and
determining, by the computer device, one or more characteristics of the target based on the estimated propagation of the first seismic energy along the first path.

2. The method of claim 1, wherein estimating the propagation of the first seismic energy along the first path comprises:
estimating, based on the first data and the second data, a propagation of the first seismic energy along a second path, the second path extending from the one or more first geophones to the target and to the one or more second geophones.

3. The method of claim 2, wherein estimating the propagation of the first seismic energy along the second path comprises:
cross-correlating the first data and the second data.

4. The method of claim 2, wherein estimating the propagation of the first seismic energy along the first path further comprises:
estimating, based on the third data and the estimated propagation of the first seismic energy along the second path, the propagation of the first seismic energy along the first path.

5. The method of claim 4, wherein estimating the propagation of the first seismic energy along the second path comprises:
cross-correlating the third data and the estimated propagation of the first seismic energy along the second path.

6. The method of claim 1, further comprising:
interpolating, by the computer device, the first data to obtain interpolated first data, the interpolated first data representing simulated measurements of the first seismic energy by one or more virtual geophones positioned at a first depth below the earth's surface.

7. The method of claim 1, further comprising:
interpolating, by the computer device, the third data to obtain interpolated third data, the interpolated third data representing simulated measurements of the second seismic energy by one or more virtual geophones positioned at a first depth below the earth's surface.

8. The method of claim 1, wherein the one or more first geophones are positioned below a first subterranean region and above a second subterranean region, and wherein a complexity of the first subterranean region is greater than a complexity of the second subterranean region.

9. The method of claim 8, wherein the target is positioned below the second subterranean region.

10. The method of claim 1, wherein the target is a subterranean structure.

11. The method of claim 1, wherein a quantity of the second geophones is greater than a sum of a quantity of the first geophones and a quantity of the third geophones.

12. The method of claim 1, wherein the measurements of the first seismic energy by the one or more first geophones comprises measurements of primary wave components of the first seismic energy.

13. The method of claim 1, wherein the measurements of the second seismic energy by the one or more third geophones comprises measurements of primary wave components of the second seismic energy.

14. The method of claim 1, wherein determining the one or more characteristics of the target comprises generating an image of the target.

15. The method of claim 1, wherein determining the one or more characteristics of the target comprises determining a subsurface feature of the target.

16. A system comprising:
one or more processors; and
one or more non-transitory computer-readable media including one or more sequences of instructions which, when executed by the one or more processors, causes:
generating first seismic energy using one or more first seismic sources positioned on an earth's surface;
obtaining first data from one or more first geophones positioned at a first depth below the earth's surface, the first data comprising measurements of the first seismic energy by the one or more first geophones;
obtaining, by a computer device, second data from one or more second geophones positioned on the earth's surface, the second data comprising measurements of the first seismic energy by the one or more second geophones;
generating second seismic energy using one or more second seismic sources positioned on an earth's surface and proximal to the one or more second geophones, wherein a gap region having an absence of seismic sources is positioned between the one or more first seismic sources and the one or more second seismic sources;
obtaining, by the computer device, third data from the one or more third geophones positioned at the first depth below the earth's surface, the third data comprising measurements of the second seismic energy by the one or more third geophones;
estimating, by the computer device based on the first data, the second data, and the third data, a propagation of the first seismic energy along a first path, the first path extending from the one or more first geophones to a target positioned at a second depth below the earth's surface and to the one or more third geophones, wherein the second depth is greater than the first depth;
interpolating, by the computer device, the first data and the third data to obtain interpolated data, wherein the interpolated data represents a simulated generation of seismic energy by one or more virtual seismic sources positioned in the gap region at the first depth below the earth's surface; and
determining, by the computer device, one or more characteristics of the target based on the estimated propagation of the first seismic energy along the first path.

17. The system of claim 16, wherein estimating the propagation of the first seismic energy along the first path comprises:
estimating, based on the first data and the second data, a propagation of the first seismic energy along a second path, the second path extending from the one or more first geophones to the target and to the one or more second geophones.

18. The system of claim 17, wherein estimating the propagation of the first seismic energy along the second path comprises:
cross-correlating the first data and the second data.

19. The system of claim 17, wherein estimating the propagation of the first seismic energy along the first path further comprises:
estimating, based on the third data and the estimated propagation of the first seismic energy along the second path, the propagation of the first seismic energy along the first path.

20. The system of claim 19, wherein estimating the propagation of the first seismic energy along the second path comprises:
cross-correlating the third data and the estimated propagation of the first seismic energy along the second path.

21. The system of claim 16, wherein the one or more sequences of instructions, when executed by the one or more processors, further causes:
interpolating, by the computer device, the first data to obtain interpolated first data, the interpolated first data representing simulated measurements of the first seismic energy by one or more virtual geophones positioned at a first depth below the earth's surface.

22. The system of claim 16, wherein the one or more sequences of instructions, when executed by the one or more processors, further causes:
interpolating, by the computer device, the third data to obtain interpolated third data, the interpolated third data representing simulated measurements of the second seismic energy by one or more virtual geophones positioned at a first depth below the earth's surface.

23. The system of claim 16, wherein the one or more first geophones are positioned below a first subterranean region and above a second subterranean region, and wherein a complexity of the first subterranean region is greater than a complexity of the second subterranean region.

24. The system of claim 23, wherein the target is positioned below the second subterranean region.

25. The system of claim 16, wherein the target is a subterranean structure.

26. The system of claim 16, wherein a quantity of the second geophones is greater than a sum of a quantity of the first geophones and a quantity of the third geophones.

27. The system of claim 16, wherein the measurements of the first seismic energy by the one or more first geophones comprises measurements of primary wave components of the first seismic energy.

28. The system of claim 16, wherein the measurements of the second seismic energy by the one or more third geophones comprises measurements of primary wave components of the second seismic energy.

29. The system of claim 16, wherein determining the one or more characteristics of the target comprises generating an image of the target.

30. The system of claim 16, wherein determining the one or more characteristics of the target comprises determining a subsurface feature of the target.

31. A non-transitory computer-readable medium including one or more sequences of instructions which, when executed by one or more processors, causes:
generating first seismic energy using one or more first seismic sources positioned on an earth's surface;
obtaining first data from one or more first geophones positioned at a first depth below the earth's surface, the first data comprising measurements of the first seismic energy by the one or more first geophones;
obtaining, by a computer device, second data from one or more second geophones positioned on the earth's surface, the second data comprising measurements of the first seismic energy by the one or more second geophones;
generating second seismic energy using one or more second seismic sources positioned on an earth's surface and proximal to the one or more second geophones, wherein a gap region having an absence of seismic sources is positioned between the one or more first seismic sources and the one or more second seismic sources;
obtaining, by the computer device, third data from the one or more third geophones positioned at the first depth below the earth's surface, the third data comprising measurements of the second seismic energy by the one or more third geophones;
estimating, by the computer device based on the first data, the second data, and the third data, a propagation of the first seismic energy along a first path, the first path extending from the one or more first geophones to a target positioned at a second depth below the earth's surface and to the one or more third geophones, wherein the second depth is greater than the first depth;
interpolating, by the computer device, the first data and the third data to obtain interpolated data, wherein the interpolated data represents a simulated generation of seismic energy by one or more virtual seismic sources positioned in the gap region at the first depth below the earth's surface; and
determining, by the computer device, one or more characteristics of the target based on the estimated propagation of the first seismic energy along the first path.

32. The non-transitory computer-readable medium of claim 31, wherein estimating the propagation of the first seismic energy along the first path comprises:
estimating, based on the first data and the second data, a propagation of the first seismic energy along a second path, the second path extending from the one or more first geophones to the target and to the one or more second geophones.

33. The non-transitory computer-readable medium of claim 32, wherein estimating the propagation of the first seismic energy along the second path comprises:
cross-correlating the first data and the second data.

34. The non-transitory computer-readable medium of claim 32, wherein estimating the propagation of the first seismic energy along the first path further comprises:
estimating, based on the third data and the estimated propagation of the first seismic energy along the second path, the propagation of the first seismic energy along the first path.

35. The non-transitory computer-readable medium of claim 31, wherein estimating the propagation of the first seismic energy along the second path comprises:
cross-correlating the third data and the estimated propagation of the first seismic energy along the second path.

36. The non-transitory computer-readable medium of claim 31, wherein the one or more sequences of instructions, when executed by the one or more processors, further causes:
interpolating, by the computer device, the first data to obtain interpolated first data, the interpolated first data representing simulated measurements of the first seismic energy by one or more virtual geophones positioned at a first depth below the earth's surface.

37. The non-transitory computer-readable medium of claim 31, wherein the one or more sequences of instructions, when executed by the one or more processors, further causes:
interpolating, by the computer device, the third data to obtain interpolated third data, the interpolated third data representing simulated measurements of the second seismic energy by one or more virtual geophones positioned at a first depth below the earth's surface.

38. The non-transitory computer-readable medium of claim 31, wherein the one or more first geophones are positioned below a first subterranean region and above a second subterranean region, and wherein a complexity of the first subterranean region is greater than a complexity of the second subterranean region.

39. The non-transitory computer-readable medium of claim 38, wherein the target is positioned below the second subterranean region.

40. The non-transitory computer-readable medium of claim 31, wherein the target is a subterranean structure.

41. The non-transitory computer-readable medium of claim 31, wherein a quantity of the second geophones is greater than a sum of a quantity of the first geophones and a quantity of the third geophones.

42. The non-transitory computer-readable medium of claim 31, wherein the measurements of the first seismic energy by the one or more first geophones comprises measurements of primary wave components of the first seismic energy.

43. The non-transitory computer-readable medium of claim 31, wherein the measurements of the second seismic energy by the one or more third geophones comprises measurements of primary wave components of the second seismic energy.

44. The non-transitory computer-readable medium of claim 31, wherein determining the one or more characteristics of the target comprises generating an image of the target.

45. The non-transitory computer-readable medium of claim 31, wherein determining the one or more characteristics of the target comprises determining a subsurface feature of the target.

* * * * *